July 31, 1923.
E. E. CHAPMAN
1,463,387
SHACKLE FOR AUTOMOBILE WHEELS AND SPOKES
Filed March 2, 1920
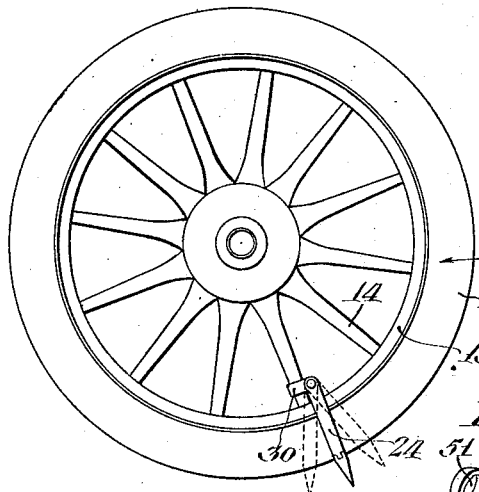
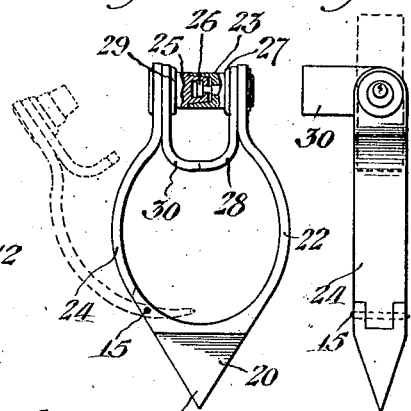
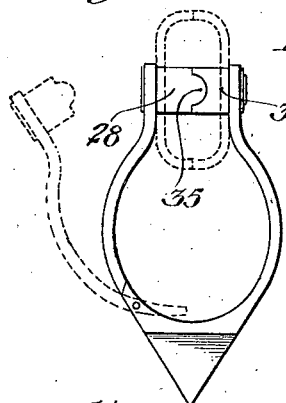
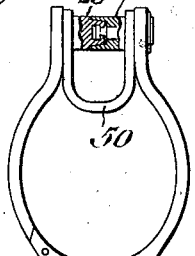
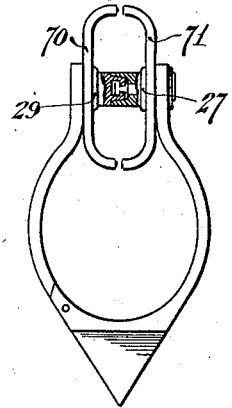
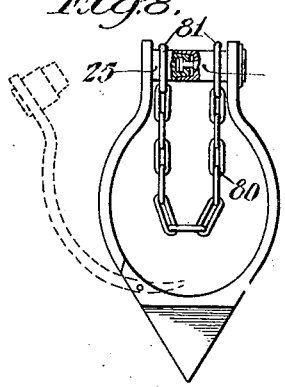
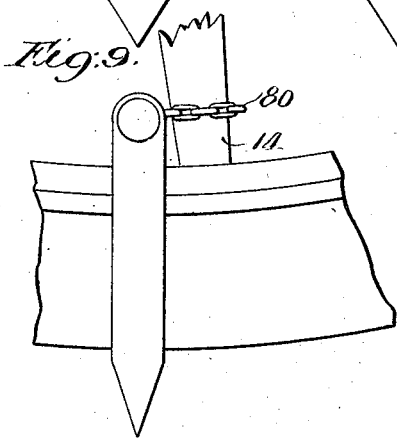
Inventor
Earle E. Chapman
by Graham + Harris
Attorneys Patented July 31, 1923.

1,463,387

UNITED STATES PATENT OFFICE.

EARLE E. CHAPMAN, OF LOS ANGELES, CALIFORNIA, ASSIGNOR TO MILLER-CHAPMAN COMPANY, A CORPORATION OF CALIFORNIA.

SHACKLE FOR AUTOMOBILE WHEELS AND SPOKES.

Application filed March 2, 1920. Serial No. 363,087.

*To all whom it may concern:*

Be it known that I, EARLE E. CHAPMAN, a citizen of the United States, residing at Los Angeles, Los Angeles County, California, have invented a new and useful Improvement Comprising the Shackle for Automobile Wheels and Spokes, of which the following is a specification.

My invention relates to shackles which are adapted to be secured about the wheel of an automobile for the purpose of preventing theft or unauthorized use thereof. Such shackles are ordinarily secured about one of the front wheels, being locked there around so that the shackle is difficult to remove and so that they will produce an unmistakable sound and make a plain trail in case the automobile is operated with the shackle in place thereon.

An object of the invention is to provide a shackle for this purpose which will make an unmistakable sound, preventing the automobile from running at a high speed, and which will also leave a distinctive mark on the surface of the street in case the automobile is driven with the shackle in the place on the wheel thereof. For this purpose I provide a bumping member which is secured on the tread of a tire and provided with a sharp projection so placed as to dig into the street if the automobile is moved with the shackle in place.

A further object of the invention is to provide a device which in addition to locking about the tire and felly of the wheel, will also lock about a spoke so that the shackle cannot be turned around on the tire to put the projection or bumping member out of action.

A still further object of the invention is to so construct the parts which lock about the spoke that they will be swiveled from the shackle in such a manner that the spoke will not be injured in case the automobile is started and run with the shackle in place thereon.

Further objects and advantages will be made evident hereinafter.

Referring to the drawing which is for illustrative purposes only, Fig. 1 is a view of the wheel of an automobile with a shackle in place thereon.

Fig. 2 is a view on an enlarged scale of one form of my invention with the locking fingers in the position they assume when packed for shipment.

Fig. 3 is a side view of same showing the fingers in the position they assume when in place on the tire of an automobile.

Fig. 4 is a view showing a shackle constructed similar to the one shown in Figs. 2 and 3, except that the locking fingers are dove-tailed together.

Fig. 5 shows a shackle using a one piece locking clamp.

Fig. 6 shows a perspective view of this clamp.

Fig. 7 shows a view of a shackle having double ended clamps.

Fig. 8 is a view of a shackle provided with a chain for locking about a spoke and Fig. 9 shows this shackle in place on a wheel.

All of these forms of shackle are designed to go over a tire 11, carried on a wheel 12 having a felly 13 and a series of spokes 14. Each of the shackles illustrated comprises a bumping block 20 having a pointed projection 21 which is so shaped that it will make a distinctive mark on the street in case the automobile is run with the shackle in place as shown in Fig. 1.

Extending upwardly from one side of the bumping block 20 is an arm 22 which terminates in a projection 23 which extends inside the felly 13 of the wheel when the shackle is in place thereon.

An arm 24 pivoted on a pin 15 on the bumping block 20 extends up and has projection 25 carrying a lock 26, the lock 26 locking the projections 23 and 25 together when the shackle is in place on the wheel. Projections 23 and 25 are preferably cylindrical. Mounted to turn freely on the projection 23 but restrained by axial movement thereon by collar 27 is a locking finger 28, and similarly secured by means of a locking collar 29 on the projection 25 is a locking finger 30. The fingers 28 and 30 are free to turn about the axis of the projections 23 and 25 assuming any of the positions shown in Fig. 3, being folded in as shown in Fig. 2 when the shackle is shipped, thus making a very compact package but being turned out in position shown in full lines in Fig. 3 and in Fig. 1 when the shackle is secured upon a wheel.

It will be noted that the shackle can turn from the full line position shown in Fig. 1 to either of the dotted positions shown in that figure without exerting any wedging or jamming action on the spoke. If the fingers 28 and 30 were formed or rigidly secured on the shackle any movement of the shackle from the full line position shown in Fig. 1 to either of the dotted line positions in that figure would result in the fingers 28 and 30 digging into the spoke of the wheel thus cutting thru the paint and defacing the spoke to a very unsightly degree. By pivoting the fingers 28 and 30 so that they can turn about the projections 23 and 25, I am thus able to not only provide a compact shipping package, but I also provide a shackle which will not mar a spoke even if the wheel is turned with the shackle in place.

In practice the shackle is put in place by unlocking the projections 23 and 25 and swinging the arm 24 with its attached finger 30 to the position shown in dotted line in Fig. 2, the shackle then being put over the wheels and fingers 28 and 30 being turned to engage a spoke previous to closing the arm 24 and locking the members 23 and 25 together.

For the purpose of insuring the fingers 28 and 30 being held in the engaged position, the finger 28 may be provided with a tongue, as shown at 35 in Fig. 4 which fits into a corresponding groove, formed in the finger 30.

As a matter of greater security but probably of less convenience, I provide the modification shown in Figures 5 and 6, in which the fingers 28 and 30 are replaced by a U shaped locking clamp 50, this clamp having openings 51 thru which the projections 25 and 23 can readily pass. The shoulders 27 and 29 are, of course, omitted in this form of lock which is operated by placing the locking clamp about a spoke and forcing the projections 23 and 25 thru the holes 51 locking them together.

A convenient modification of my invention is shown in Fig. 7 in which double ended locking fingers 70 and 71 are used. These locking fingers are free to turn in a similar manner to the fingers 28 and 30 and are restrained by collars 27 and 29.

A still further modification of my invention is shown in Fig. 8 in which the locking fingers are replaced by a chain 80 having rings 81 of sufficient size to allow the projections 23 and 25 to pass there between. In practice the chain 80 is wrapped about the spoke 14 as shown in Fig. 9 and the projections are locked together thru the rings 81.

I claim as my invention:

1. A shackle for an automobile wheel comprising a bumping block; arms for securing said block upon the tread of said wheel; projections on said arms meeting inside the felly of the wheel; means for locking said projections together; a finger pivoted to turn freely on one of said projections and engage a spoke; and a second finger pivoted on the other projection and cooperating with said first named finger to entirely encircle a spoke.

2. A shackle for an automobile wheel comprising a bumping block; arms for securing said block upon the tread of said wheel; projections on said arms meeting inside the felly of the wheel; means for locking said projections together; a finger pivoted to turn freely on one of said projections and engage a spoke; and a second finger pivoted on the other projection and cooperating with said first named finger to entirely encircle a spoke, said fingers being mechanically interlocked with each other when said projections are locked together.

3. A shackle for an automobile wheel comprising a bumping block; a projection formed on said block and adapted to make a distinctive mark on the surface of the street if the automobile is moved with the shackle in place on a wheel thereof; arms for securing said block upon the tread of said wheel; projections on said arms meeting inside the felly of the wheel; means for locking said projections together; a finger pivoted to turn freely on one of said projections and engage a spoke; and a second finger pivoted on the other projection and cooperating with said first named finger to entirely encircle a spoke.

4. A shackle for an automobile wheel comprising a bumping block; a projection formed on said block and adapted to make a distinctive mark on the surface of the street if the automobile is moved with the shackle in place on a wheel thereof; arms for securing said block upon the tread of said wheel; projections on said arms meeting inside the felly of the wheel; means for locking said projections together; a finger pivoted to turn freely on one of said projections and engage a spoke; and a second finger pivoted on the other projection and cooperating with said first named finger to entirely encircle a spoke, said fingers being mechanically interlocked with each other when said projections are locked together.

In testimony whereof, I have hereunto set my hand at Los Angeles, California, this 25th day of February 1920.

EARLE E. CHAPMAN.